United States Patent
Hultgren et al.

[11] Patent Number: 6,105,363
[45] Date of Patent: Aug. 22, 2000

[54] COOLING SCHEME FOR TURBINE HOT PARTS

[75] Inventors: Kent Goran Hultgren, Winter Park; Brian Charles Owen, Orlando; Steven Wayne Dowman, Orlando; Raymond Scott Nordlund, Orlando; Ricky Lee Smith, Oviedo, all of Fla.

[73] Assignee: Siemens Westinghouse Power Corporation, Orlando, Fla.

[21] Appl. No.: 09/067,593

[22] Filed: Apr. 27, 1998

[51] Int. Cl.⁷ .................................................. F02C 3/00
[52] U.S. Cl. .......................................... 60/39.75; 415/175
[58] Field of Search ............................... 60/39.75, 39.83, 60/39.32, 39.37; 415/115, 116, 173.1, 173.2, 175, 176, 178

[56] References Cited

U.S. PATENT DOCUMENTS

| | | | |
|---|---|---|---|
| 2,783,613 | 3/1957 | Von Zborowski | 60/39.66 |
| 3,095,699 | 7/1963 | Baver | 60/39.02 |
| 4,555,902 | 12/1985 | Pilarczyk | 60/39.5 |
| 4,596,116 | 6/1986 | Mandet et al. | 60/39.75 |
| 4,821,522 | 4/1989 | Matthews et al. | 60/757 |
| 5,134,841 | 8/1992 | Rehwinkel et al. | 60/39.02 |
| 5,412,937 | 5/1995 | Tomlinson et al. | 60/39.02 |
| 5,557,922 | 9/1996 | Hoshino et al. | 60/39.75 |
| 5,611,197 | 3/1997 | Bunker | 60/39.75 |

*Primary Examiner*—Charles G. Freay
*Attorney, Agent, or Firm*—Eckert Seamans Cherin & Mellott, LLC

[57] ABSTRACT

A closed-loop cooling scheme for cooling stationary combustion turbine components, such as vanes, ring segments and transitions, is provided. The cooling scheme comprises: (1) an annular coolant inlet chamber, situated between the cylinder and blade ring of a turbine, for housing coolant before being distributed to the turbine components; (2) an annular coolant exhaust chamber, situated between the cylinder and the blade ring and proximate the annular coolant inlet chamber, for collecting coolant exhaust from the turbine components; (3) a coolant inlet conduit for supplying the coolant to said coolant inlet chamber; (4) a coolant exhaust conduit for directing coolant from said coolant exhaust chamber; and (5) a piping arrangement for distributing the coolant to and directing coolant exhaust from the turbine components. In preferred embodiments of the invention, the cooling scheme further comprises static seals for sealing the blade ring to the cylinder and flexible joints for attaching the blade ring to the turbine components.

6 Claims, 2 Drawing Sheets

COOLING SCHEME FOR TURBINE HOT PARTS

This invention was conceived under United States Department of Energy Contract DE-FC21-95MC32267. The United States Government has certain right hereunder.

FIELD OF THE INVENTION

The present invention relates generally to gas turbines, and more particularly to a closed-loop cooling scheme for stationary hot parts of a gas turbine.

BACKGROUND OF THE INVENTION

Combustion turbines comprise a casing or cylinder for housing a compressor section, combustion section and turbine section. The compressor section comprises an inlet end and a discharge end. The combustion section or combustor comprises an inlet end and a combustor transition. The combustor transition is proximate the discharge end of the combustion section and comprises a wall which defines a flow channel which directs the working fluid into the turbine section's inlet end. A supply of air is compressed in the compressor section and directed into the combustion section. Fuel enters the combustion section by means of a nozzle. The compressed air enters the combustion inlet and is mixed with the fuel. The air/fuel mixture is then combusted to produce high temperature and high pressure gas. This working gas is then ejected past the combustor transition and injected into the turbine section to run the turbine.

The turbine section comprises rows of vanes which direct the working gas to the airfoil portions of the turbine blades. The working gas flows through the turbine section causing the turbine blades to rotate, thereby turning the rotor, which is connected to a generator for producing electricity.

As those skilled in the art are aware, the maximum power output of a combustion turbine is achieved by heating the gas flowing through the combustion section to as high a temperature as is feasible. The hot gas, however, heats the various turbine components, such as the transition, vanes and ring segments, that it passes when flowing through the turbine.

Accordingly, the ability to increase the combustion firing temperature is limited by the ability of the turbine components to withstand increased temperatures. Consequently, various cooling methods have been developed to cool turbine hot parts. These methods include open-loop air cooling techniques and closed-loop cooling systems.

Conventional open-loop air cooling techniques divert air from the compressor to the combustor transition to cool the turbine hot parts. The cooling fluid extracts heat from the turbine components and then transfers into the inner transition flow channel and merges with the working fluid flowing into the turbine section. One drawback to open-loop cooling systems is that it diverts much needed air from the compressor, e.g., a significant amount of air flow is needed to keep the flame temperature of the combustor low. Another drawback to open-loop cooling of a combustor transition is increased $No_x$ emissions. It is, therefore, desirable to provide a cooling system that diverts less air from the compressor and controls $No_x$ emissions.

Conventional turbine closed-loop cooling assemblies generally comprise at least one manifold, strain relief devices, such as piston rings or bellows, and a supply of cooling fluid located outside the turbine. The manifold typically comprises an outer casing. The strain relief devices are employed to connect the manifold outer casing proximate the component that must be cooled.

The closed-loop cooling manifolds receive cooling fluid from the source outside the turbine and distribute the cooling fluid circumferentially about the turbine casing. Unlike open-loop cooling systems, the closed-loop cooling fluid remains separated from the working fluid that flows through the turbine flow path and is diverted to a location outside the turbine.

Conventional closed-loop cooling systems, however, employ relatively complex manifold attachment assemblies. These manifold attachment assemblies, in turn, add to the overall expense of maintaining a combustion turbine. Conventional manifold attachment assemblies must be precisely designed to enable the manifolds to sufficiently couple with the turbine casing. It is, therefore, desirable to provide a more simplified and economical closed-loop cooling scheme.

Conventional closed-loop cooling schemes typically utilize complex piping schemes to connect a manifold to the cooling fluid source outside the turbine. When cooling several hot parts of a turbine, the number of pipes can be great. Each pipe also requires joints such as piston rings or bellows for attachment to the manifold, or if there is no manifold, directly to the turbine hot parts. More pipes and joints yield more costly installation and maintenance of the turbine. It is, therefore, desirable to provide a closed-loop cooling scheme that requires less pipes and therefore, less joints, than conventional cooling schemes.

Piston rings and bellows of conventional closed-loop cooling schemes also have their own drawbacks. Both piston rings and bellows have poor fatigue life characteristics. Piston rings have significant leakage rates, require large pressure drops to operate properly and must maintain proper alignment to be effective. Both bellows and piston rings are also difficult to install as well as maintain. In addition, bellows and piston rings are not very flexible in responding to changing conditions or positioning of parts to which they connect. It is, therefore, desirable to provide a closed-loop cooling scheme that utilizes pipe joints that are superior to piston rings and bellows.

SUMMARY OF THE INVENTION

A closed-loop cooling scheme for cooling stationary combustion turbine components, such as vanes, ring segments and transitions, is provided. The cooling scheme comprises: (1) an annular coolant inlet chamber, situated between the cylinder and blade ring of a turbine, for housing coolant before being distributed to the turbine components; (2) an annular coolant exhaust chamber, situated between the cylinder and the blade ring and proximate the annular coolant inlet chamber, for collecting coolant exhaust from the turbine components; (3) a coolant inlet conduit for supplying the coolant to said coolant inlet chamber; and (4) a coolant exhaust conduit for directing coolant from said coolant exhaust chamber.

In a preferred embodiment of the invention, the cooling scheme further comprises a piping arrangement for distributing the coolant to and directing coolant exhaust from the turbine components. The piping arrangement comprises inlet pipes and inlet passages for supplying the coolant from the coolant inlet chamber to the turbine components and exhaust pipes and exhaust passages for directing the coolant from the turbine components to the coolant exhaust chamber.

In another preferred embodiment of the invention, the cooling scheme further comprises static seals for sealing the blade ring against the cylinder and flexible joints for attaching the blade ring to the turbine components. In another preferred embodiment of the invention, the cooling scheme further comprises an air supply system for supplying air to positively pressurize an inter-stage seal located radially inward of second row vanes of the turbine.

DETAILED DESCRIPTION OF THE PREFERRED EMBODIMENTS

Figure 1:
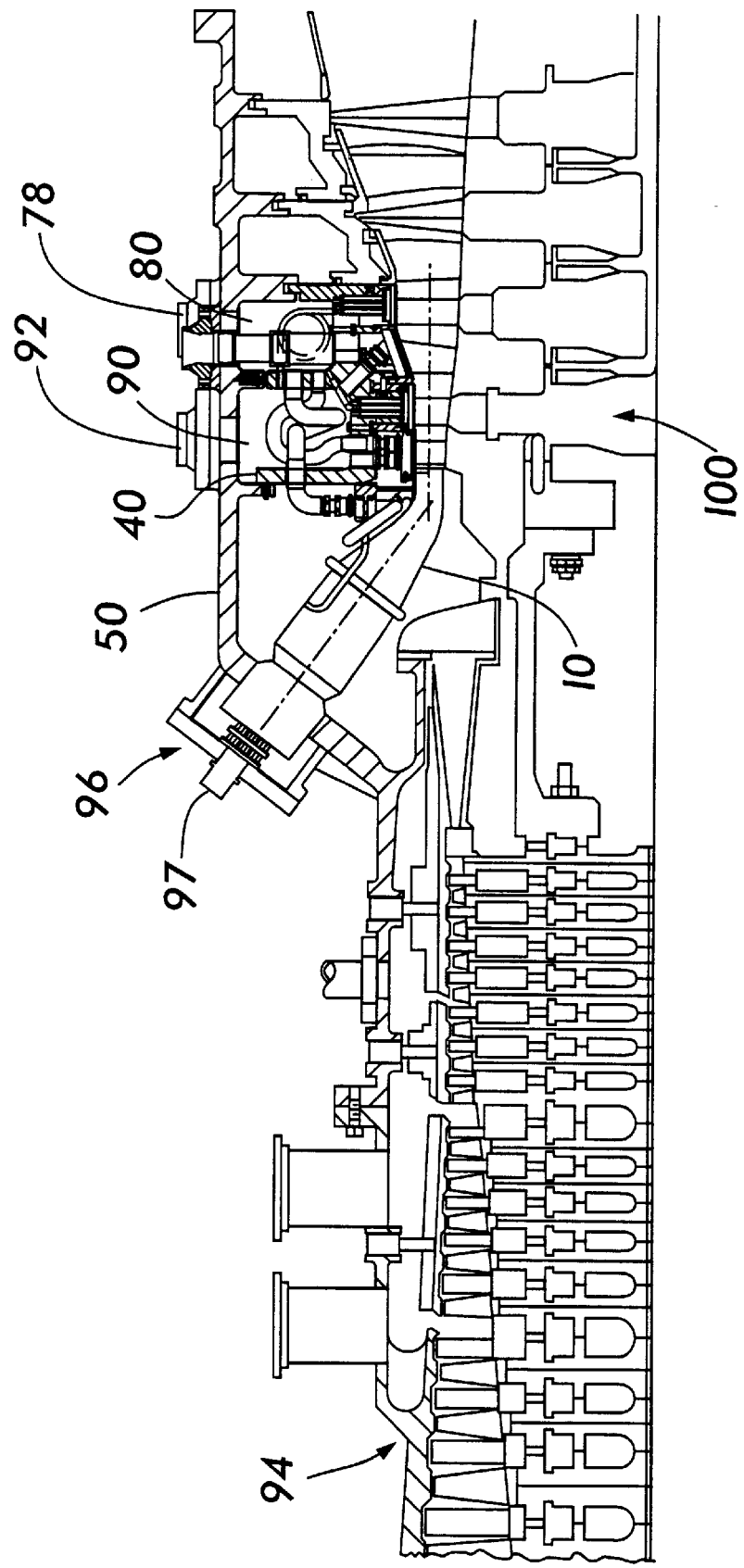
FIG. 1 is a cross-sectional view of a closed-loop cooling scheme according to the present invention in cooperation with a combustion turbine.

Referring to the drawings, there is shown in FIG. 1 a cross-sectional view of the closed-loop cooling scheme according to the present invention in cooperation with a combustion turbine. FIG. 1 shows a compressor section 94, a combustion section 96, a nozzle 97 and a turbine section 100, about which the cooling scheme is centered.

Figure 2:
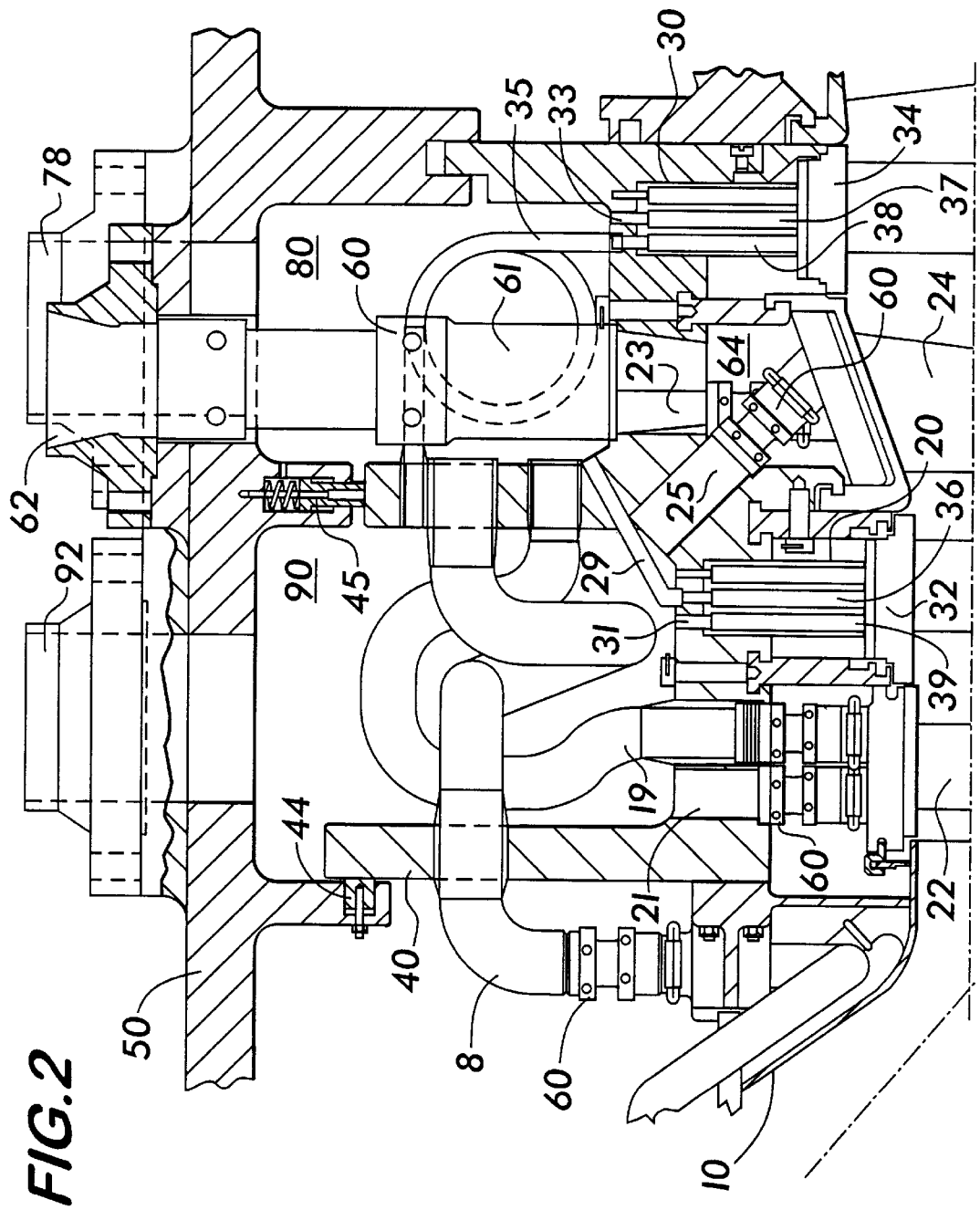
FIG. 2 is a cross-sectional view of a closed-loop cooling scheme according to the present invention in cooperation with a section of the top half of a turbine.

FIG. 2 shows a cross-sectional view of a preferred embodiment of the closed-loop cooling scheme according to the present invention in cooperation with a section of the top half of a turbine. The section of turbine shown in FIG. 2 comprises a transition 10, vanes 22 and 24, ring segments 32 and 34, a blade ring 40 and a cylinder 50. Of these turbine components, the cooling scheme of the present invention is intended to cool the first and second row vanes 22 and 24, first and second row ring segments 32 and 34, and the transition 10, collectively referred to as the turbine hot parts. These turbine components are situated at regular intervals about the circumference of the turbine.

The closed-loop cooling scheme of the present invention comprises an annular coolant inlet chamber 80 for housing coolant before being distributed to the turbine hot parts, an annular coolant exhaust chamber 90 for collecting coolant exhaust from the turbine hot parts, a coolant inlet conduit 78 for supplying the coolant to the coolant inlet chamber 80, a coolant exhaust conduit 92 for directing coolant from the coolant exhaust chamber 90, and a piping arrangement for distributing the coolant to and directing coolant from the turbine hot parts. Preferably, the coolant is steam, but the invention is equally applicable to other coolant media. In addition, the cooling scheme utilizes static seals 44 and 45 for sealing the blade ring 40 to the cylinder 50, and flexible joints 60 for attaching the blade ring 40 to the turbine hot parts to achieve fluid communication between the turbine hot parts and the chambers 80 and 90.

The piping arrangement of the present invention comprises inlet channels and exhaust channels through the blade ring 40. Inlet channels are inlet pipes, inlet passages or a combination of both. Exhaust channels are exhaust pipes, exhaust passages or any combination thereof. Passages, as opposed to pipes, are sometimes utilized in locations where the channel need pass through the blade ring 40. Inlet channels supply the coolant to the turbine components to be cooled and extend from the coolant inlet chamber 80 to each hot part. Exhaust channels direct the coolant from the turbine components and extend from each hot part to the coolant exhaust chamber 90. Ultimately, the number of channels making up the piping arrangement depends on the number of turbine hot parts situated about the turbine.

In a preferred embodiment of the present invention, the cooling scheme will be installed on a ATS "Advanced Turbine System") turbine. Because there are sixteen transitions 10 on the ATS turbine, there are sixteen pairs of inlet channels (pipes 8) and exhaust channels (pipes-not shown) to cool the transition 10. Similarly, there are thirty-two pairs of inlet channels (pipes 19) and exhaust channels (passages 21) for the first row vanes 22, thirty-two pairs of inlet channels (passages 23) and exhaust channels (passages 25) for the second row vanes 24, forty-eight pairs of inlet channels (pipes 29 and 36) and exhaust channels (pipes 39 and passages 31) for the first row ring segments 32, and forty-eight pairs of inlet channels (pipes 37 and passages 33) and exhaust channels (pipes 35 and 38) for the second row ring segments 34. Note that FIGS. 1 and 2 only show the cooling scheme at one location about the turbine.

In operation of the cooling scheme of the present invention, coolant from an external source enters through the coolant inlet conduit 78 into the coolant inlet chamber 80, where it is directed through the inlet pipes of the piping arrangement and openings in the blade ring 40 to the turbine hot parts. Heat is transferred to the coolant from the hot parts and the coolant is directed through the exhaust pipes of the piping arrangement and openings in the blade ring 40 into the coolant exhaust chamber 90, where it is exhausted through the coolant exhaust conduit 92 to a heat recovery unit (not shown).

Before operation of the cooling scheme as described above with steam as the coolant, hot air is used instead of cooling steam to heat up the system. Without this warm-up period with hot air, the cooling steam would create condensation throughout the system. Similarly, after operation of the cooling scheme with cooling steam, hot air is once again run through the system to limit the amount of condensation that may form.

Because the coolant inlet chamber 80 is situated directly above the second row vanes 24 and second row ring segments 34, no piping is needed to supply coolant to these parts. Only flexible joints 60 are needed to connect the blade ring 40 to these parts, as passages through the blade ring 40 complete the connection to the coolant inlet chamber 80. Piping 35 and 38 are needed, however, to exhaust the coolant from the second row ring segments 34 because the second row ring segments 34 are located a distance away from the coolant exhaust chamber 90.

All pipes are hard-welded to the blade ring 40 except where additional flexibility and ease of assembly are needed. During start-up and shut-down of the turbine, relative thermal movement is expected between the vanes 22 and 24 and the blade ring 40. To combat this problem, flexible connections or flexible joints 60 are needed between the blade ring 40 and the vanes 22 and 24 to allow relative axial and lateral movement of the vanes 22 and 24. Preferably, flex-slide joints 60, manufactured by EG&G Pressure Science, are utilized instead of bellows or piston rings. Aspects of the flex-slide joints 60 are described U.S. Pat. Nos. 4,054,306, 4,448,449, and 4,071,269.

These flexible joints 60 provide a line-contact sealing surface during expansion, contraction and angulation of the connection. Initial evaluations of piston-ring joints and the flex-slide joints 60 reveal that the flex-slide joints 60 have leakage rates that are $\frac{1}{10}$ that of piston ring joints. Preferably, as shown in FIG. 2, the flex-slide joints 60 are used to connect the transition 10 and the vanes 22 and 24 to the coolant inlet chamber 80 and coolant exhaust chamber 90.

Portions 36 and 37 of the inlet channels and portions 39 and 38 of the exhaust channels for the ring segments 32 and 34, are housed in towers 20 and 30, respectively. The towers 20 and 30 are cylindrical housings which are received by and bolted to the blade ring 40 to accommodate the portions 36, 37, 39 and 38. The ring segments 32 and 34 do not require flexible joints 60 and instead, bolts are used to connect the towers 20 and 30 to the ring segments 32 and 34.

The preferred embodiment of the present invention, as shown in FIG. 2, utilizes an air supply system which floods an annular cavity 64 between the second row vanes 24 and the blade ring 40 with air. The air is needed to positively pressurize an inter-stage seal (not shown) located radially inward of the second row vanes 24. Positive pressurization is needed at the inter-stage seal so that working fluid does not make contact with the turbine rotor structure.

The air supply system comprises four air inlet conduits 62, four flexible joints 60, and an annular cavity 64. Using the annular cavity 64 to distribute air circumferentially about the turbine enables the air to be supplied without spanning the horizontal joint of the turbine without piping. After the top half of the cylinder 50 is installed, the four flexible joints 60 are made through the cylinder 50 to the blade ring, spaced at 90 degree intervals about the turbine.

The air supply system requires bleed air from the the compressor. This air enters the cooling scheme at the air inlet conduits 62, travels through the wall of cylinder 50, through the coolant inlet chamber 80 (by means of the flexible joints 60 and the air conduits 61), through the blade ring 40 and into the annular cavity 64 between the second row vanes 24 and the blade ring 40. Preferably, the flexible joints 60 are flex-slide joints 60 and the air conduits 61 are conduits.

During installation, all pipes are coupled, preferably hard-welded, to the blade ring 40 before the blade ring 40 is rolled into the cylinder 50. The flexible joints 60 are attached to the vanes 22 and 24 with rigid couplers and welded into the blade ring 40. The flexible joints 60 allow for simple alignment and installation of the air inlet conduits 62, vanes 22 and 24 and transitions 10. The cooling scheme allows for axial installation of the first row vanes 22 and circumferential installation of the second row vanes 24. Bolting at the horizontal joint, and the joint itself, also present design changes. For example, the inlet and exhaust channels need to be routed around the bolts and through the horizontal joint boss by means of slots and/or drilled holes.

Plugging the small cooling passages in the turbine hot parts with contaminants and oxidants that spall off over time is of concern. In an effort to minimize the possibility of blockage, filters or screens upstream of the stationary hot parts may be used. "Clean" materials are also used for piping and weld-cladding the inside of the coolant inlet chamber 80, i.e., the surfaces of the cylinder 50 and the blade ring 40. This reduces the amount and size of debris that may enter the stationary hot parts.

INCONELO® alloy 625, a nickel-chromium heat-and corrosion-resisting alloy manufactured by INCO Alloys International, Inc., of Huntington, W.Va., is the preferred "clean" material for such applications. In addition, where the inlet to a hot part is a passage through the blade ring 40 instead of a pipe, a sleeve made of INCONEL® alloy 625 is used to shield the cooling flow from eroded material on the surface of the passageway through the blade ring 40.

The advantages of the cooling scheme of the present invention are several. Although some air is diverted from the compressor section of the turbine to provide air to the air supply system, the closed-loop cooling aspect of the present invention diverts less air from the compressor than open-loop cooling systems and thereby controls $No_x$ emissions.

Although the inter-stage seal cavity 64 can be considered a type of manifold assembly, the cooling scheme of the present invention only utilizes the air supply system to positively pressurize the inter-stage seal cavity 64. The particular piping arrangement, i.e., the four air inlet conduits 62, are used to isolate the air separate from the cooling steam in the coolant inlet chamber 80.

The cooling scheme itself that directly affects the cooling uses no manifold assemblies. Consequently, the present scheme does not require precise machining and alignment design or maintenance as conventional closed-loop cooling schemes that utilize manifolds which must be precisely machined and aligned and maintained to enable the manifolds to sufficiently couple with the turbine blade ring 40. Therefore, the cooling scheme design of the present invention is more simplified and economical than conventional closed-loop cooling schemes.

There are several advantages of the present invention that stem from the annular coolant inlet chamber 80 and the annular coolant exhaust chamber 90. The chambers 80 and 90 provide a common exhaust and common inlet. This reduces the number of required pipes and joints at the cylinder 50 as well as the blade ring 40. The chamber design also allows for the passages through blade ring 40 to achieve direct fluid communication with the chambers 80 and 90 without the need for extra piping. This direct communication also leads to the use of fewer joints. In addition, there are no pipe-to-pipe connections with the chamber design as are typically found on conventional cooling schemes.

Less piping structure and fewer joints yields less costly installation and maintenance of the turbine. Efficiency of the turbine is also improved with the chamber design. The shorter pipes lead to less loss of cooling capacity as the cooling fluid travels a shorter distance from the coolant inlet chamber 80 to the particular hot part to be cooled. Another benefit of the chamber design of the present invention is that the chambers 80 and 90 make use of already existing components, i.e., the cylinder 50 and blade ring 40 of the turbine.

The use of flexible joints in the cooling scheme of the present invention improves upon conventional systems that utilize piston rings and bellows. The flex-slide joints 60 provide a line-contact sealing surface during expansion, contraction and angulation of the connections. The flex-slide joints 60 have much smaller leakage rates and require less pressure drops for operation than piston-ring joints. Flex-slide joints 60 are easier to install and maintain than both bellows and piston rings, making maintenance of other turbine parts less burdensome. In addition, the flex-slide joints 60 are very flexible in responding to changing conditions or positioning of parts to which they connect.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A closed-loop cooling scheme for cooling stationary combustion turbine components, the turbine having a cylinder and a blade ring, the cooling scheme comprising:

an annular coolant inlet chamber, situated between the cylinder and the blade ring, for housing coolant before being distributed to the turbine components;

an annular coolant exhaust chamber, situated between the cylinder and the blade ring and proximate said annular coolant inlet chamber, for collecting coolant exhaust from the turbine components;

a coolant inlet conduit for supplying the coolant to said coolant inlet chamber, said coolant inlet conduit being in fluid communication with said annular coolant inlet chamber;

a plurality of inlet channels, in fluid communication with said coolant inlet chamber and the turbine components to be cooled, for supplying the coolant to the turbine components;

a plurality of exhaust channels, in fluid communication with the turbine components to be cooled and said coolant exhaust chamber, for directing the coolant from the turbine components; and a coolant exhaust conduit for directing the coolant exhaust from said coolant exhaust chamber, said coolant exhaust conduit being in fluid communication with said annular coolant exhaust chamber.

2. The cooling scheme of claim 1 further comprising:

a piping arrangement for distributing the coolant to and directing coolant exhaust from the turbine components.

3. The cooling scheme of claim 1 further comprising:

static seals for sealing the blade ring to the cylinder; and flexible joints for attaching the blade ring to the turbine components.

4. The cooling scheme of claim 3, wherein the flexible joints are flex-slide joints.

5. The cooling scheme of claim 3 further comprising:

an air supply system for supplying air to positively pressurize an inter-stage seal located radially inward of second row vanes of the turbine, said air supply system comprising:

at least one annular cavity, said annular cavity being in fluid communication with the inter-stage seal; and a plurality of air inlet conduits for supplying air to said at least one annular cavity, said air inlet conduits being in fluid communication with said at least one annular cavity.

6. A combustion turbine comprising:

a compressor for compressing air;

a nozzle for injecting fuel into said combustor;

a combustor in fluid communication with said compressor for receiving the compressed air, said combustor also in fluid communication with said nozzle for receiving the fuel, said combustor for producing working fluid from the air and fuel, said combustor comprising a combustor transition for directing said working fluid into a turbine section;

a turbine section mechanically coupled in fluid communication with said combustor transition for receiving the working fluid to run the turbine;

a cylinder surrounding the turbine to serve as an outer casing of the turbine;

a blade ring situated inside of the cylinder and surrounding turbine components; and a cooling scheme for cooling stationary turbine components, the cooling scheme comprising:

an annular coolant inlet chamber, situated between the cylinder and the blade ring, for housing coolant before being distributed to the stationary turbine components;

an annular coolant exhaust chamber, situated between the cylinder and the blade ring and proximate said annular coolant inlet chamber, for collecting coolant exhaust from the stationary turbine components;

a coolant inlet conduit for supplying the cooling coolant to the coolant inlet chamber, said coolant inlet conduit being in fluid communication with said annular coolant inlet chamber;

a coolant exhaust conduit for directing coolant from the coolant exhaust chamber, said coolant exhaust conduit being in fluid communication with said annular coolant exhaust chamber;

a plurality of inlet channels, in fluid communication with said coolant inlet chamber and the turbine components to be cooled, for supplying the coolant to the turbine components;

a plurality of exhaust channels, in fluid communication with the turbine components to be cooled and said coolant exhaust chamber, for directing the coolant from the turbine components; and a piping arrangement for distributing the coolant to and directing coolant exhaust from the stationary turbine components.

\* \* \* \* \*